United States Patent Office 2,938,887
Patented May 31, 1960

2,938,887
WATER-SOLUBLE COPOLYMERS

Philip Weiss, Nutley, N.J., assignor to Colgate-Palmolive Company, Jersey City, N.J., a corporation of Delaware No Drawing. Filed Nov. 15, 1955, Ser. No. 547,024

9 Claims. (Cl. 260—78.5)

The present invention relates to novel water-soluble ethers of polyalkoxamer ester graft copolymer, and to a process for preparing the same.

Graft copolymers are a recent development in the field of polymeric chemistry. A survey of the literature indicates that the preparations of graft copolymers have been accomplished specifically by the polymerization of a monomer in the presence of a preformed polymer as indicated by J. Polymer Science, vol. 8, page 289 (1952), and vol. 9, page 61 (1952), or from a polymeric hydroperoxide as shown in J. Polymer Science, vol. 16, page 345 (1955). The preparation by the former method based upon chain transfer is limited in scope since the two homopolymers may be obtained in addition to the graft copolymer. A tedious fractionation in selected mixed solvents is required for the desired graft copolymer. The preparation from an autoxidized polymer yields graft copolymers with few links because of the low yields obtained during formation of the hydroperoxide groups. It is apparent that there are many difficulties involved in the published methods for preparation of graft copolymers which place restrictions upon the type, structure and composition of the products which can be formed thereby.

It has been proposed to admix polyalkylene glycols with certain polymeric materials having functional groups. In general, the product is a heterogeneous mixture or, if reaction occurs, the resulting material is a water-insoluble gel-like or resinous product.

In accordance with the present invention, a new type of graft copolymer containing a predetermined balance of hydrophilic and hydrophobic units to impart a desired degree of water solubility to the product has been discovered which relates to a water-soluble graft copolymer of a vinyl compound and a carboxylic acid ester, the alcoholic portion of said ester comprising a polymeric hydrophilic chain of a polyalkoxamer monoether having at least 5 alkoxamer units.

The novel products of the present invention may be prepared in any suitable manner. In general, a method which has been found to be conducive to commercial operation and produces a product in good yield and purity comprises the transesterification of a hydrophobic copolymer of a vinyl compound and a carboxylic acid ester with a polyalkylene glycol ether so as to form the corresponding ester ester of said carboxylic copolymer and said polyglycol ether.

The final products are essentially non-(cross-linked) in order to avoid rigidity to the molecule and provide a hydrophilic tail on a hydrophobic backbone. The resulting materials are characterized by the fact that they are essentially non-ionic and therefore are conpatible with many different types of materials. They may be heated to reasonably elevated temperatures without materially affecting the structure and properties of the products, such as would occur by cross-linking. Since the initial copolymer is an ester which is transesterified by the polyalkylene glycol monoether, the resulting product is substantially completely free of reactive or functional groups such as carboxylic, hydroxyl or carboxylic salt groups, which would tend to cause cross-linking, gelling, insolubility upon heating, etc. Since the initial copolymer is hydrophobic, it is essential that the polyalkylene glycol ether chain which is grafted thereon be sufficiently hydrophilic to produce a water-soluble product. Such water-soluble graft copolymers retain solubility in non-polar solvents and have useful application in many fields of endeavor therefore. Thus, the products may be used as emulsifying, wetting and thickening agents, lime soap curd dispersants or anti-static agents, etc., in detergent compositions and cosmetics such as shampoos and lotions, in textile-treating compositions, in the manufacture of dispersions, etc.

The backbone copolymer should be selected so that it is essentially linear and hydrophobic with a sufficient number of potential points for grafting so as to permit desired variation in structure, composition and properties with varying proportions of the hydrophilic side-chains in the final product.

A type of copolymer which has been found to be particularly suitable as an initial reactant is a copolymer of an aromatic vinyl compound and an ester of an unsaturated carboxylic acid. Examples of the former material are styrene and substituted styrene compounds containing inert substituents such as alkyl styrenes, e.g. methyl and ethyl styrene; halogenated styrenes, e.g. p-chlorostyrene, 2,4-dichlorostyrene and m-bromostyrene; alkoxy styrenes, e.g. p-methoxystyrene; nitrogen-substituted styrenes, e.g. p-nitrostyrene and p-dimethylaminostyrene, and the like. Suitable examples of the ester monomers are the esters of unsaturated carboxylic acids having the conjugated grouping (—C=C—CO). It is preferred to use the esters derived from such acids and aliphatic saturated monohydric alcohols, and particularly the di-lower alkyl esters of polycarboxylic acids, such as dimethyl maleate, diethyl maleate, diethyl fumarate, dimethyl itaconate, di-n-butyl itaconate, dimethyl citraconate, and the like. The corresponding esters derived from aromatic alcohols, cycloaliphatic alcohols or heterocyclic alcohols may be employed also. Examples of such esters are di-phenyl maleate, di-cyclohexyl maleate, di-2-hydroxythiophene maleate. Other suitable esters derived from monocarboxylic acids and the same alcohols as indicated above may be employed such as methyl crotonate, methyl isocrotonate, ethyl crotonate, methyl acrylate, methyl methacrylate, etc.

The initial copolymer is known in the art, such as the copolymer of styrene and dimethyl maleate illustrated in J. Am. Chem. Soc., vol. 70, p. 1533 (1948). In known manner, products of varying composition and molecular weight may be formed as desired, depending upon the concentrations of the monomers, their reactivities, initiator and other conditions of the reaction. For example, the above copolymer is formed from styrene and dimethyl maleate at 56° C. using a peroxide initiator such as benzoyl peroxide. Variations in copolymer composition may be effected by changing the initial molar concentrations of the monomers, and variations in molecular weight may be effected by changing the concentration of initiator.

It is preferred to employ copolymers wherein the molar ratio of the aromatic vinyl compound, e.g. styrene, to the carboxylic ester is from about 1:1 to about 10:1 and usually up to 5:1. The copolymers may have any suitable molecular weights but optimum effects are obtained with copolymers having a molecular weight up to about 100,000 and usually up to about 50,000.

The copolymer containing the functional carboxylic groups in the form of esters is reacted with the polyglycol monoether so as to result in a transesterification reaction. This novel type of graft copolymer may be illustrated by the following typical diagrammatic equation showing the transesterification of poly(styrene co dimethyl maleate) with the monoalkyl ether of a polyethylene glycol:

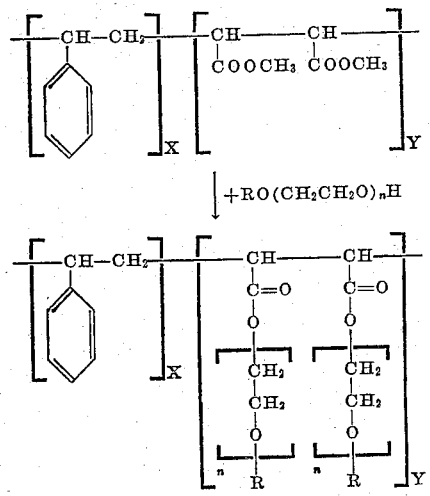

where X is the number of moles of styrene and Y is the number of moles of maleate compound which determines the composition of the initial copolymer, n is the number of alkoxamer units (at least 5) in the polyalkylene glycol monoether and R is an alkyl group.

The polyalkylene glycol monoethers used as a reactant may be obtained in any suitable manner. They may be prepared with any desired number of repeating alkyleneoxy units by the reaction of an alcohol or a monoalkyl ether of a glycol or polyglycol with a predetermined quantity of an epoxide compound. Examples of glycol ethers are mono-methyl, mono-ethyl and mono-butyl ethers of ethylene glycol; Carbitol and methyl and butyl Carbitol which may be condensed with an alkylene oxide such as ethylene, propylene and butylene oxide; glycidyl phenyl ether, glycidyl acetate, etc., to yield the desired monoether of the polyalkyleneglycol.

The polyalkylene glycol monoethers should have a sufficient number of alkyleneoxy units to confer water-solubility to the desired product. The term "water-soluble" is inclusive of colloidal solubility or dispersibility in water. While the number of such repeating hydrophilic units is variable to some extent depending upon the composition of the copolymer and the specific structure of the glycol ethers, it is considered that the polyglycol ethers should have a minimum of about 5 alkoxamer groups, and preferably about 8–30 alkoxamer units. The polyglycol ethers having up to about 100 ether groups may be used similarly, though no advantage is apparent once the number of ether groups is sufficient to produce water solubility in the product.

Examples of suitable monoethers of polyoxyalkylene glycols are the alkyl ethers such as methyl, ethyl, n-propyl, isopropyl, n-butyl, iso-butyl, n-amyl, n-hexyl, n-octyl, n-dodecyl and n-octadecyl monoethers of polyethylene glycols of 6, 8, 10, 12, 15, 16, 18, 24 and 30 ethylene oxide units respectively, though it is preferred to employ the lower alkyl monoethers of said polyethylene glycols having up to 6 carbons in said alkyl group. The corresponding ethers of polypropylene glycols and polybutylene glycols having the same number of alkylene oxide units may be used also. In place of the above alkyl monoethers, the corresponding aryl ethers may be employed also, such as the phenyl and tolyl monoethers of polyethylene glycols having 12 and 14 ethylene oxide units. The term "polyalkoxamer" or "polyalkyleneoxy" refers to the repeating alkylene oxide radical in the chain of the polyglycol ether, which may be substituted or unsubstituted. It is unsubstituted in the case of the polyethylene glycol monoethers indicated above. This chain may contain inert substituents or radicals of an aliphatic, aromatic or heterocyclic structure so as to produce a substituted polyalkyleneoxy chain. For example, such substituted polyoxyalkylene glycol monoethers may be prepared by the use of epoxides such as glycidyl acetate or glycidyl phenyl ether as described above which, after transesterification, yield a graft copolymer having polyalkoxamer chains containing aliphatic and aromatic substituents respectively.

The transesterification reaction may be conducted under varying conditions. The reaction is effected by mixing suitable proportions of the reactants and heating at any suitable temperature to produce the desired product. In general, substantially stoichiometric or equivalent ratios of the polyglycol monoether to the number of ester groups of the initial copolymer may be employed, but it is preferred to use an excess of the polyglycol monoether in order to insure maximum transesterification. Accordingly the amount of polyglycol monoether per ester group of the initial copolymer is usually from about 1:1 to about 50:1 molar ratio in practice. The reaction should be conducted at any suitable elevated temperature but it is preferred to use temperatures sufficiently high to distill off the alcohol which is released from the initial copolymer, e.g. vaporizing methanol liberated from the transesterification of poly(styrene co dimethyl maleate). Upon heating of the reactants, the mixture tends to form a miscible system and thus the presence of an organic solvent is unnecessary. If desired, suitable inert organic solvent, preferably high boiling, may be employed such as toluene, xylene, chlorobenzene, etc. It is preferred to use a small amount of an esterification catalyst in order to accelerate the transesterification reaction, such as sodium, sodium methoxide, sodium ethoxide, etc.

The resulting polyalkoxamer ether ester product is recovered from the reaction mixture readily. If desired, it may be further purified by treatment with a suitable solvent such as methanol, diethyl ether, n-hexane, etc.

This process of transesterification represents an effective means of grafting the polyoxyalkylene glycol monoether chains to the initial ester copolymer in good yield and purity without any tendency to side-reactions, cross-linking, etc. This transesterification reaction is an equilibrium reaction which can be controlled or directed so as to result in a particular degree of transesterification, ranging from a few percent up to substantially complete reaction of the ester groups. For example, the removal of the methyl alcohol or the like which is liberated and the use of a catalytic amount of the esterification catalyst increase the yield. Thus, the final product may contain the ester groups substantially completely in the form of the polyoxyalkylene monoethers or it may contain varying proportions of such ester groups with the remaining ester groups retained in original form. The transesterification should be at least about 5%, and preferably at least about 10%, in the number of ester groups (mole percent) in order to produce the desired water-solubility in the product.

The following specific examples are further illustrative of the nature of the present invention, but it is to be understood that the invention is not limited thereto. All amounts of the various ingredients are by weight unless otherwise specified.

Example I

Styrene (0.5 mole) is copolymerized with dimethyl maleate (1.5 moles) in a sealed jar at 60° C. for 70 hours using 0.54 mole percent of benzoyl peroxide as the initiator. The poly(styrene co dimethyl maleate) is obtained as a white solid by precipitation from methanol. This copolymer (approx. mol. wt.=20,000) contains approximately 3 styrene units per dimethyl maleate as determined by the methoxyl analysis.

Polyethylene glycol monomethyl ether is prepared by bubbling ethylene oxide through a reaction mixture containing 38 grams of distilled ethylene glycol monoethyl ether and 0.5 grams of sodium for 18 hours at 150° C., resulting in a yield of 373 grams. Analysis of the product indicates a molecular weight of 837 and the addition of 17 ethylene oxide units to the ethylene glycol monomethyl ether.

To a mixture of 5 grams of the poly(styrene co dimethyl maleate) and 50 grams of the polyoxyethylene glycol monomethyl ether (mol. wt. 837), there is added 0.5 gram of metallic sodium. The reaction mixture is heated at 140–145° C. for 3 hours. It is permitted to cool and is extracted with diethyl ether to remove unreacted polyoxyethylene glycol monomethyl ether. The diethyl ether insoluble fraction is 12 grams. Analysis: Found C, 57.06; H, 7.66; O, 35.28. The resulting methyl polyoxyethylene poly(styrene co dimethyl maleate) is highly water soluble and surface active.

*Example II*

To a mixture of 5 grams of poly(styrene co dimethyl maleate) and 50 grams of polyoxyethylene glycol monomethyl ether (mol. wt.=600, average of 12.9 ethylene oxide units) there is added 0.5 gram of cut sodium. The mixture is heated at 110–120° C. for 3 hours. The homogeneous solution is dripped into methanol and the white solid obtained is further purified by trituration in diethyl ether; yield=3.3 grams. Analysis: Found C, 74.65; H, 7.09; O, 18.26. The resulting methyl polyoxyethylene poly (styrene co dimethyl maleate) is water dispersible and surface-active.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure, and compounds set forth above are intended to be illustrative only and are not intended to limit the scope of the invention.

Having thus described the invention, what is claimed is:

1. A water-soluble copolymer of (*a*) a styrene compound selected from the group consisting of styrene and styrene bearing inert substituents, any such substituent having at most two carbons, and (*b*) an alpha, beta ethylenically unsaturated aliphatic carboxylic acid ester of monohydric alcohol, said carboxylic acid ester having at most two carboxylic groups, at least 5 mole percent of said alcohol being a terminal monoether of a polyglycol selected from the group consisting of polyoxyalkylene glycol and polyoxyalkylene glycol bearing inert substituents, said terminal monoether group being selected from the class consisting of monoalkyl ether and monoaryl ether groups, and said glycol having at least about 5 alkyleneoxy units, said copolymer being substantially free of ionic groups and the carboxy groups of said acid being substantially completely esterified by said alcohol.

2. A water-soluble copolymer of (*a*) a styrene compound selected from the group consisting of styrene and styrene bearing inert substituents, any such substituent having at most two carbons, and (*b*) an alpha, beta ethylenically unsaturated aliphatic carboxylic acid ester of monohydric alcohol, said carboxylic acid ester having at most two carboxylic groups, at least 5 mole percent of said alcohol being a terminal monoalkyl ether of a polyglycol selected from the group consisting of polyoxyalkyline glycol and polyoxyalkylene glycol bearing inert substituents, said glycol having at least about 5 alkyleneoxy units, said copolymer being substanially free of ionic groups and the carboxy groups of said acid being substantially completely esterified by said alcohol.

3. A water-soluble copolymer of (*a*) a styrene compound selected from the group consisting of styrene and styrene bearing inert substituents, any such substituent having at most two carbons, (*b*) an alpha, beta ethylenically unsaturated aliphatic dicarboxylic acid ester of monohydric alcohol, at least 5 mole percent of said alcohol being a terminal monoalkyl ether of a polyoxyalkylene glycol having at least about 5 alkyleneoxy units, said copolymer being substantially free of ionic groups and the carboxy groups of said acid being substantially completely esterified by said alcohol.

4. A water-soluble copolymer in accordance with claim 3 wherein said glycol ether is monoalkyl ether of a polyoxyethylene glycol having about 8 to 30 ethyleneoxy units and up to 6 carbon atoms in said monoalkyl group.

5. A water-soluble copolymer in accordance with claim 3 wherein said copolymer has a molar ratio of styrene to said carboxylic acid ester from about 1:1 to 10:1.

6. A water-soluble copolymer of styrene and maleic acid di-ester of aliphatic monohydric alcohol, at least 5 mole percent of said alcohol being a terminal monoalkyl ether of a polyoxyethylene glycol having at least about 5 ethyleneoxy units, said copolymer being substantially free of ionic groups and the carboxy groups of said acid being substantially completely esterified by said alcohol.

7. A water-soluble copolymer in accordance with claim 6 which contains maleic acid ester of monomethyl ether of a polyoxyethylene glycol having about 8 to 30 ethyleneoxy units.

8. A process which comprises heating in the presence of a tranesterification catalyst a copolymer of styrene and dimethyl maleate with monoalkyl ether of a polyoxyethylene glycol having at least 5 ethyleneoxy units, the molar ratio of said glycol ether per ester group of said copolymer being from about 1:1 to about 50:1, vaporizing methyl alcohol from the reaction mixture and forming a transesterification product of said copolymer and said monoalkyl ether of said polyoxyethylene glycol.

9. A process which comprises heating in the presence of a transesterification catalyst a monoether of a polyoxyalkylene glycol having at least about 5 alkyleneoxy units with a copolymer of (*a*) a styrene compound selected from the group consisting of styrene and styrene bearing inert substituents, any such substituent having at most two carbons, and (*b*) an alkyl ester of an alpha, beta ethylenically unsaturated aliphatic carboxylic acid having at most two carboxylic acid groups, the molar ratio of said glycol ether per ester group of said copolymer being from about 1:1 to about 50:1, and forming a tranesterification product of said glycol ether and said copolymer.

References Cited in the file of this patent

UNITED STATES PATENTS

| | | |
|---|---|---|
| 1,970,578 | Schoeller et al. | Aug. 21, 1934 |
| 2,129,694 | Izard | Sept. 13, 1938 |
| 2,382,938 | Gresham | Aug. 14, 1945 |
| 2,815,369 | Holt | Dec. 3, 1957 |

OTHER REFERENCES

Boundy et al.: Styrene, Its Polymers and Derivatives, Reinhold Publishing Corp., 1952, page 863.